United States Patent [19]
Mehra et al.

[11] Patent Number: 5,681,908
[45] Date of Patent: *Oct. 28, 1997

[54] ABSORPTION PROCESS FOR REJECTION OF REACTOR BYPRODUCTS AND RECOVERY OF MONOMERS FROM WASTE GAS STREAMS IN OLEFIN POLYMERIZATION PROCESSES

[75] Inventors: Yuv R. Mehra, The Woodlands; Robert H. Stodghill, Houston, both of Tex.

[73] Assignee: Advanced Extraction Technologies, Inc., Houston, Tex.

[*] Notice: The term of this patent shall not extend beyond the expiration date of Pat. No. 5,521,264.

[21] Appl. No.: 591,314

[22] Filed: Jan. 25, 1996

Related U.S. Application Data

[63] Continuation-in-part of Ser. No. 398,349, Mar. 3, 1995, Pat. No. 5,521,264.

[51] Int. Cl.$^6$ .......................................................... C08F 2/34
[52] U.S. Cl. ........................... 526/68; 526/69; 526/70; 95/143; 95/237; 95/238; 95/240
[58] Field of Search ................................ 526/68, 69, 70; 95/143, 237, 238, 240

[56] References Cited

U.S. PATENT DOCUMENTS

| | | | |
|---|---|---|---|
| 3,969,470 | 7/1976 | Spiegelman | 260/897 A |
| 4,009,097 | 2/1977 | Ward | 208/342 |
| 4,035,167 | 7/1977 | Starks . | |
| 4,340,701 | 7/1982 | Willmore et al. . | |
| 4,372,758 | 2/1983 | Bobst et al. . | |
| 4,482,687 | 11/1984 | Noshay et al. | 526/125 |
| 4,521,573 | 6/1985 | Lee et al. | 526/125 |
| 4,588,790 | 5/1986 | Jenkins et al. . | |

(List continued on next page.)

FOREIGN PATENT DOCUMENTS

| | | |
|---|---|---|
| 0 071 430 | 3/1986 | European Pat. Off. . |
| 4 217 611 | 12/1993 | Germany . |
| 857259 | 12/1960 | United Kingdom . |

OTHER PUBLICATIONS

Bauer, "Safe Ethylene Recovery from FCC Off-Gas Streams," Prepared for Presentation at AIChE 1994 Spring National Meeting, Atlanta, Georgia (Apr. 17–21, 1994).

Mehra, "Can We Really Afford to Keep Burning Light Olefins and Hydrogen in our Refineries?," CMAI Seminar, Houston, Texas (Mar. 24–25, 1993), pp. 1–10.

Mehra, "Processing Hydrocarbon Gases with the Mehra Process Technology," Chemical Engineering (Oct. 27, 1986), Houston, Texas.

Fair et al., "Ethylene Purification—Demethanization," Chemical Eng. Progress, vol. 54, No. 12 (Dec. 1958), pp. 39–47.

*Primary Examiner*—David W. Wu
*Attorney, Agent, or Firm*—Arnold, White & Durkee

[57] ABSTRACT

A process for rejecting reactor byproduct from the polymerization reactor in an olefins polymerization process wherein reactor waste gas stream(s) comprising unreacted monomers, reactor byproduct and light components are treated in an absorption process to additionally recover the monomers. The absorption process comprises contacting the reactor waste gas stream(s) with an absorption solvent in an absorption zone to produce a gas stream comprising the light components, and a liquid stream comprising the absorption solvent, absorbed reactor byproduct and absorbed monomers. The liquid stream is fractionated in a distillation column to produce a distillation column bottoms stream that is the absorption solvent which is conveyed to the absorption zone, and an overhead stream comprising the monomers and reactor byproduct which is further fractionated in a splitter column to reject the reactor byproduct as a bottoms stream. The recovered monomers from the splitter overhead can be conveyed to the reactor. In a preferred embodiment, the absorption solvent consists essentially of components derived from the reactor waste gas stream(s) so that no external solvent is required.

30 Claims, 1 Drawing Sheet

U.S. PATENT DOCUMENTS

| | | |
|---|---|---|
| 4,666,998 | 5/1987 | Hagerty . |
| 4,740,222 | 4/1988 | Mehra . |
| 4,781,896 | 11/1988 | Willmore et al. . |
| 4,820,463 | 4/1989 | Raufast . |
| 4,832,718 | 5/1989 | Mehra . |
| 5,019,143 | 5/1991 | Mehra . |
| 5,220,097 | 6/1993 | Lam et al. . |
| 5,241,023 | 8/1993 | Brule et al. . |
| 5,266,276 | 11/1993 | Chinh et al. . |
| 5,326,929 | 7/1994 | Mehra et al. . |
| 5,376,742 | 12/1994 | Krause . |

ABSORPTION PROCESS FOR REJECTION OF REACTOR BYPRODUCTS AND RECOVERY OF MONOMERS FROM WASTE GAS STREAMS IN OLEFIN POLYMERIZATION PROCESSES

RELATED APPLICATION

This is a continuation-in-part of U.S. application Ser. No. 08/398,349, filed Mar. 3, 1995, now U.S. Pat No. 5,521,264 of Yuv R. Mehra and Robert H. Stodghill, entitled "Gas-Phase Olefin Polymerization Process with Recovery of Monomers from Reactor Vent Gas by Absorption."

FIELD OF THE INVENTION

This invention relates to absorption processes for rejecting reactor byproducts and recovering unreacted monomers present in waste gas streams from olefin polymerization processes.

BACKGROUND OF THE INVENTION

Gas phase polymerization is the predominant reactor technology used to produce olefin plastic resins. The catalysts are contained in solid substrate particles from which the polymer chains grow. The particles are fluidized in a fluidized bed by a gas stream containing the monomers.

Gas phase fluidized bed reactors are used to produce linear low density polyethylene (LLDPE) resins, which are the largest and fastest growing segment of the polymer market. LLDPE resins are copolymers of ethylene and from between about 3% to about 10% by weight an alpha-olefin comonomer. Suitable alpha olefin comonomers for LLDPE resins include propylene; butene 1; 4-methyl pentene-1; hexene-1; and octene-1. Butene-1 and hexene-1 are used in highest volume. LLDPE resins are characterized and defined by their density which is in the range of between about 0.91 and 0.94 g/cc. Gas phase reactors are also used to produce the ethylene homopolymers, high density polyethylene (HDPE), which has a density in the range of between about 0.94 and 0.98 g/co.

The polymerization reactions are exothermic. The heat of reaction is absorbed by the reactor gas as sensible heat which increases the temperature as it flows up through the reactor. The heat of reaction is dissipated by cooling the reactor gas stream in heat exchangers prior to recycling the gas to the reactor inlet.

In recent designs the heat removal capacity of the reactor is significantly increased by adding catalytically inert condensable liquids such as butane, pentane or hexane to the reactor feed gas stream. This development flies in the face of long-standing conventional wisdom which taught that stable fluidization could not be sustained if the reactor gas contained more than a minor amount of liquid. This is an important development because, in general, heat removal capacity is the major bottleneck that limits production capacity of the reaction section. The liquids vaporize in the reaction zone, thus increasing the heat removal capacity in the reactor by absorbing heat of vaporization (latent heat) in addition to the sensible heat increase of the reactor gas. The inert condensables are condensed in the recycle heat exchangers and the liquid is recycled to the reactor, either entrained in the recycle gas stream or separated and recycled to the reactor as a separate liquid stream.

Polymerization reaction temperature is typically in the range from about 85° F. to about 220° F. and pressure from about 150 to about 350 psig. Ethylene partial pressure in the reactor gas phase is typically in range of from about 20 to about 150 psia and comonomer partial pressure is typically in the range of from about 5 to 50 psia. The gas phase typically includes nitrogen (or other inert gas, e.g., argon and helium) to provide sufficient linear velocity for smooth fluidization, and to makeup the difference between the partial pressure of the monomers and the total pressure required in the gas phase. Nitrogen also is a sensible heat sink which absorbs heat of reaction with increase of temperature as the reactor gas flows up through the reactor. A small amount of hydrogen is added to the gas phase to control the molecular weight (melt index) of the polymer via chain transfer reactions.

To maintain the fluidized bed at a constant height, polymer reactor product in the form of a fine granular powder is continually discharged from the reactor entrained in a stream of reactor gas at a rate equal to the rate of polymer formation in the reactor. The reactor product is discharged into a product discharge tank in which most of the reactor gas is separated from the product polymer powder and the separated reactor gas is recycled back to the reactor. Typically, the reactor product powder is conveyed out of the discharge tank by a stream of nitrogen or other inert gas into a product purge tank. The reactor product flowing from the product discharge tank unavoidably carries entrained reactor gas that contains unreacted monomers and solvents as well as the purge nitrogen. The product polymer also contains monomers and solvent that are dissolved and physically adsorbed in the polymer.

Entrained and adsorbed reactor gas must be removed from the product polymer powder before the product is conveyed on to storage or further processing to preclude forming explosive gas mixtures. Otherwise, the monomers and other hydrocarbons will diffuse out of the product polymer powder in downstream vessels which contain air. The requisite purging is accomplished in the product purge tank by blowing a stream of nitrogen countercurrently up from the bottom of the purge tank through the polymer. This flushes out entrained reactor gas and strips and desorbs dissolved hydrocarbons out of the product powder. Typically, the waste gas stream is disposed of by burning it in a flare stack. Following are typical stream rates for the waste gas stream from the product purge tank in an LLDPE unit producing 22,000 lbs. per hour of an LLDPE butene-1 copolymer using hexane as the cocatalyst/activator solvent:

| Component | Typical Vent Stream Flow & Composition | | |
|---|---|---|---|
| | lb/hr | wt % | vol % |
| Ethylene | 265 | 22.44 | 25.25 |
| Butene-1 | 238 | 20.15 | 11.34 |
| Hexane | 25 | 2.12 | 0.78 |
| Nitrogen | 610 | 51.65 | 58.21 |
| Ethane | 27 | 2.29 | 2.40 |
| Hydrogen | 1 | 0.08 | 1.33 |
| $C_4$'s | 15 | 1.27 | 0.69 |

The comonomers lost in product vent stream represent a substantial economic loss to polyolefin producers. Also, there is the continually rising cost of disposing of the vent gas to meet air quality protection codes. Typically, from about one to about two percent of the ethylene fed to the process is lost in the waste gas stream. Comonomer losses are much higher ranging from about 10% for butene-1 to about 50% for hexene-1. The fraction of comonomer that is lost in the waste gas stream increases with molecular weight of the comonomer because the solubility of comonomer in the product polyolefin increases with the molecular weight of the comonomer. Monomer and comonomer vent losses add between about one to two cents per pound to the cost of making polyolefins which is a substantial sum considering that worldwide production of gas phase polyolefins is approaching 20 million tons per year. In addition, the vent gas also contains significant amounts of hydrocarbon solvents such as hexane which also have value.

Similarly, polypropylene resins represents the fastest-growing category of commodity thermoplastic resins in the world and are now surpassed only by the polyethylenes and polyvinyl chloride in total volume of production. Polypropylene's very low density (0.90–0.91 g/cc) combined with good mechanical properties and good injection-molding characteristics make it very suitable for the large-volume cost- and weight-conscious automotive market. Polypropylene has replaced the natural fibers in the carpet backing market and plays an important role in the non-wovens market. Polypropylene films provide excellent optical clarity and low moisture vapor transmission. Other key applications include packaging for snack foods, baked goods, cheese, coffee and tea, wettable paper-packed tapes to pressure-sensitive tapes, shrink-film overwrap, disposable diaper tabs and closures, etc.

Because of the pendant methyl group on the polymer chain, the polypropylene monomer unit is asymmetric and can assume either the isotactic, with all methyl groups aligned on the same side of the chain, or syndiotactic, with methyl groups alternating. All other forms where the positioning of the methyl group is more or less random, are called atactic.

Polypropylene homopolymer can be rendered impact-resistant by blending it with ethylene/propylene elastomers in a compounding and extrusion operation. A wider range of properties are achieved through copolymerization of propylene with ethylene or alpha-olefins (e.g., butene-1, hexene-1) in conjunction with ethylene. Copolymers are of two types: random copolymers, in which ethylene molecules are inserted randomly between the propylene molecules in the polymer chain, and block copolymers, in which a string of propylene molecules is periodically interrupted by strings of ethylene-propylene copolymer or polyethylene. Typical commercial random copolymers contain 2–4 weight percent ethylene (or ethylene plus butene) but some specialty high-ethylene content grades contain 5–8 weight percent ethylene. Generally, the term polypropylene includes copolymers and blends.

Commercial polypropylene resins are characterized by their isotactic content (isotactic index) or percentage insoluble in boiling heptane. Commercial grades typically have an isotactic index of about 94.5–97.5%. They are obtained through so-called coordination polymerization, employing heterogeneous Ziegler-Natta-type catalyst systems, typically, combinations of titanium and magnesium chlorides complexed with aluminum alkyl compounds, and organic ester modifiers. Newer high yield/high-selectivity catalysts can produce polymers with isotactic indexes up to 99.5%. An entirely new family of stereospecific catalyst systems based on metallocenes of zirconium, hafnium and titanium with an aluminoxane cocatalyst are currently being commercialized.

Most polypropylene processes require polymer-grade propylene monomer (99.5 wt % propylene), but some catalyst Systems tolerate Use of chemical-grade propylene (95 wt % propylene). The monomer must be free from such catalyst poisons as water, oxygen, carbon dioxide, hydrogen, sulfur and acetylene. Polypropylene processes can be classified according to their, reaction medium and the type of reactor configuration. The commercially available processes are as follows:

Bulk processes—In these processes, polymerization takes place in liquid propylene phase within either a liquid pool reactor or a loop reactor.

Slurry processes—In these processes, propylene is dissolved in an inert hydrocarbon diluent such as butane, pentane, hexane, heptane or nonane within either a (1) continuous stirred-tank reactor; (2) batch stirred-tank reactor; (3) loop reactor; or (4) boiling butane.

Gas-phase processes—Here the propylene is polymerized directly to a solid polymer in either a (1) fluid bed reactor; (2) horizontal stirred bed reactor; or (3) vertical stirred bed reactor.

Technically, the bulk processes are slurry processes. When propylene is used as a diluent for the monomer, the process is termed as the bulk process. On the other hand, when processes use other compounds than propylene as diluent, the processes are termed as slurry process.

In the slurry processes, polymerization occurs at a temperature below the melting point of the polymer in a liquid in which the polymer is essentially insoluble. Polymerization takes place in the liquid hydrocarbon diluent contained in a stirred tank, liquid pool or loop reactor. Diluents used include propylene for loop reactor systems, propylene or butane for liquid pool systems, and hexane, heptane or nonane for heavy and very heavy diluent stirred tank systems. The polymerization temperature (typically about 75° C.) is below the melting point of the polymer so that the polymer forms as solid particles in the hydrocarbon diluent. For propylene and light diluent systems, the polymer slurry leaving the reactor is flashed at reduced pressure for solvent recovery, and the remaining mass is then purged to vaporize unreacted monomer. If a heavier diluent is used, solid polymer is centrifugally recovered. The polymer powder is then dried, mixed with stabilizers and additives, and finally extruded and pelletized.

As with the gas-phase polyethylene processes, all gas-phase polypropylene processes involve direct polymerization of propylene to a solid; no solvent slurry or solution steps nor the related solvent separation, flashing or purification steps are generally necessary. Typical homopolymer and random copolymer reaction conditions for gas-phase propylene polymerization are 60°–90° C. (usually about 85° C.) and about 40 atmospheres pressure. A second-stage reactor is required for block copolymer production via gas-phase processes.

Regardless of the type of polypropylene process, nitrogen (or another inert gas, such as argon or helium) is used to free the polymer from any residual unreacted monomers in product purge bin or product column. This nitrogen carries with it valuable unreacted monomers and is flared; this represents a significant loss of the monomers.

Because small amount of hydrogen is added to the polymerization reactor system to control the molecular weight (melt index) of the polymer via chain transfer reactions, a side reaction results in the formation of saturated hydrocarbons. For the polyethylene processes, ethylene is hydrogenated to ethane; and for the polypropylene processes, propylene is hydrogenated to propane. Since most of the unreacted monomers (ethylene and/or propylene) are recycled back to the polymerization reactor, the concentration of saturated hydrocarbons (ethane and/or propane) thus formed in the reactor begins to build up in the circulating monomer recycle loop.

While the operating conditions for the polymerization of monomers in the reactor are selected so as to minimize the side hydrogenation reaction, operators are forced to purge the saturated hydrocarbons from the reactor or the monomer recycle circulation loop in order to prevent their build-up in the monomer recirculation loop around the reactor. Since the composition of the saturated hydrocarbons in the recirculation circuit is quite low, less than 5 wt %, the loss of contained monomer is very significant.

Thermal cracking of hydrocarbon feedstocks is the primary production route to ethylene, propylene and other olefin monomers. The high cost of olefins and the large capital investments for new thermal cracking plants logically should motivate olefin polymerization operators to recover ethylene, propylene and other comonomer olefins from polyolefin reactor vent streams before purchasing monomers. Why don't then the polyolefin operators recover the valuable monomer components from waste gas streams? The answer is that the only technology currently on the market to recover monomers from waste gas stream(s) is cryogenic technology and with the cryogenic processes currently available, it is cheaper for operators to buy or produce makeup monomers than to recover the monomers from vent gas.

Moreover, cryogenic processes are not flexible and do not adapt to changes in feed composition and feed gas flow rates that occur in polyolefin plants. So that although monomer recovery from polyolefin reactor vent gases is technically feasible, it is impractical to use currently available commercial cryogenic recovery processes.

For the foregoing reasons, there is need for a flexible and cost effective process for recovering ethylene, propylene or other alpha olefin comonomers and hydrocarbon-based cocatalyst solvents from vent gases emitted from olefin polymerization plants.

The solution lies in Mehra processes which are absorption processes that utilize a physical absorption solvent to separate and recover hydrogen, nitrogen, methane, ethylene and other valuable hydrocarbons from mixed hydrocarbon streams. Mehra technology has been applied to recover ethylene, hydrogen and methane from refinery and petrochemical off-gas streams and to reject nitrogen from natural gas. Generally, Mehra processes compete with cryogenic processes in these applications. Depending on the application, Mehra specifies absorption solvents that are selected from preferred groups and process designs which optimally synergize solvent with process. Among the preferred Mehra solvents are C4 to C10 hydrocarbons including paraffins, naphthenes and aromatics. Mehra technology is described in U.S. Pat. Nos. 4,832,718, 4,740,222, 5,019,143, 5,220,097 and 5,326,929, which are incorporated herein by reference.

In general, Mehra processes operate at a higher temperature than cryogenic processes which provides advantages over cryogenic processes: 1) Exotic cryogenic construction materials required to withstand cryogenic temperatures are not required in Mehra processes; 2) Feed purification specifications are more relaxed; 3) Cryogenic processes are intensively heat integrated to reduce energy consumption whereas Mehra processes are not. Accordingly, Mehra processes are more flexible and adaptable to changes. Process conditions can be changed quickly "on-line" with no adverse impact on operability and without equipment modifications to alter product stream compositions or maintain product composition should feed composition change.

SUMMARY OF THE INVENTION

The present invention is directed to an olefin polymerization process wherein the waste gas streams, emitted from the polymer product purge tanks, product purge bins, polymerization reactor and/or the monomer recirculation loop around the reactor, contain unreacted monomers (ethylene and/or propylene), higher alpha olefins, cocatalyst solvent, or inert condensables and saturated hydrocarbon formed in the reactor or introduced in the olefin feedstock. Depending upon the location of the source of the waste gas stream, the nitrogen content of the vent gas may vary from 30 to 75 percent by weight with the rest of the stream comprised of monomers, comonomers, higher alpha olefins, cocatalyst solvents, or inert condensables and saturated hydrocarbons (such as ethane and propane) formed in the reactor. The vent gases are processed to recover the valuable unreacted monomers, solvents and/or inert condensables. The recovered components are recycled back to the reactor.

The recovery technology employed is Mehra physical absorption technology. In a preferred embodiment of the process of the present invention, the Mehra solvent can be produced within the process from heavy hydrocarbon components in the feed stream; no external solvent is required. Alternatively, the absorption solvent can be an external solvent that meets the Mehra criteria, such as butane, pentane or hexane. However, using an external solvent requires additional solvent storage, handling and makeup costs which raise the cost of recovering the monomers.

The process of the present invention provides the means to control the build-up of the reactor byproduct of saturated hydrocarbons in the monomer recirculation loop around the polymerization reactor and simultaneously recovers monomers, such as ethylene and/or propylene, comonomers and solvents at a cost that is competitive with the cost of purchased monomers, comonomers and solvents. Moreover, the process flexibly adapts to variations in the flow rate and composition of polyolefin waste gas streams fore the polymer product purge tanks, product purge bins, polymerization reactor and/or the monomer recirculation loop around the reactor. Accordingly, the process of the present invention offers a practical, operable and cost-effective technology for rejecting reactor byproduct saturated hydrocarbons, and recovering and recycling ethylene and/or propylene monomers, comonomers, solvents, and the nitrogen that are currently wasted along with the reactor byproduct saturated hydrocarbons.

The Mehra unit of the present invention includes the steps of:

(a) continuously and countercurrently contacting the waste gas stream(s) from an olefin polymerization reactor system with an absorption solvent stream in an absorption zone to produce an absorption zone overhead gas stream comprised of nitrogen and other light components, and an absorption zone bottoms liquid stream comprised of the absorption solvent and absorbed unreacted monomers and reactor byproduct;

(b) fractionating the absorption bottoms liquid stream in a distillation column to produce an overhead stream comprising the unreacted monomers, and reactor byproduct, and a liquid bottoms stream consisting essentially of the absorption solvent;

(c) fractionating the overhead stream from the distillation column in a splitter column to produce an overhead stream of unreacted monomers and a bottoms stream comprising reactor byproduct; and (d) conveying the liquid bottoms stream from the distillation column in step (b) to the absorption zone as the absorption solvent in step (a).

In a preferred embodiment, the recovered stream of unreacted monomers from the overhead of the splitter column, is conveyed back to the polymerization reactor system. The splitter column is operated to produce a bottoms stream of reactor byproduct at the same rate the saturated hydrocarbons are formed or introduced with the olefin feedstock in the polymerization reactor.

In another preferred embodiment, the absorption solvent consists essentially of heavy hydrocarbons and/or the least volatile monomers, that are derived from the waste gas stream(s) from the olefin polymerization reactor system; in this case, no external solvent is used. The recovered heavy hydrocarbons and/or the least volatile monomers present in the waste gas stream(s) are withdrawn from the bottoms of the distillation column and conveyed back to the polymerization reactor system.

In still another embodiment, preferred for waste gas stream(s) that contain heavy hydrocarbons and/or heavy comonomers, the waste gas stream(s) from the olefin polymerization reactor system, including the polymer purge and degassing steps, are compressed and cooled. Some of the heavy components condense in the coolers and are separated from the reactor waste gas stream(s). The condensate is conveyed to the reactor system or alternatively to an appropriate point in the light ends section of a nearby fractionating plant.

Preferentially, absorption zone bottoms stream is reboiled and, optionally, interreboiled in a stripping zone to strip light ends comprising nitrogen and hydrogen out of the absorber bottoms stream. Also, optionally, the absorption solvent is intercooled at one or more points in the absorption zone to improve absorption efficiency.

Other significant aspects of the process of the present invention include the techniques for controlling inventory and composition of the absorption solvent.

Co-pending U.S. application Ser. No. 08/398,349, filed Mar. 3, 1995, of Yuv R. Mehra and Robert H. Stodghill, entitled "Gas Phase Olefin Polymerization Process with Recovery of Monomers from Reactor Vent Gas by Absorption" is incorporated in its entirety herein by reference.

These and other features, aspects and advantages of the present invention are better understood with regard to the following description, appended claims, and accompanying drawings.

Figure 1:
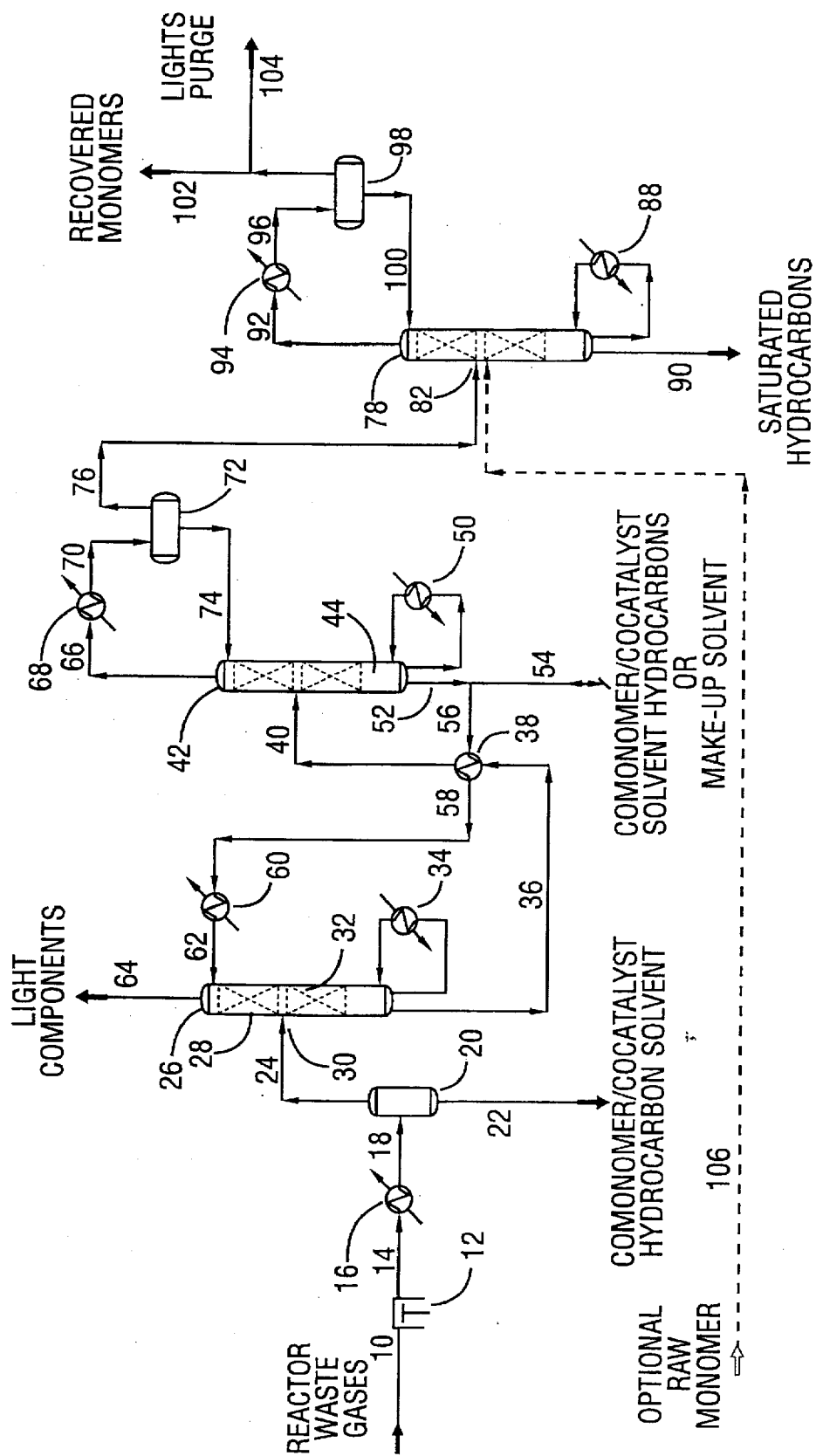
FIG. 1 is a simplified process flow diagram of an absorption unit that rejects polymerization reactor byproducts and recovers monomers, comonomers, solvents, and nitrogen from various waste gas stream(s) from the olefin polymerization reactor system.

In the interest of clarity, certain pumps, heat exchangers, control valves, control systems, and auxiliary equipment items that are necessary for the practical and safe operation of the unit but are not necessary to illuminate the inventive concepts have intentionally been left out of the drawing. Engineers and operators skilled in process technology will generally understand that the deleted equipment is included in practical and safe operating units. Accordingly, the deletions do not limit the scope of the invention.

DETAILED DESCRIPTION OF THE PREFERRED EMBODIMENTS

The process of the present invention is generally applicable to any olefin polymer that is produced either in (1) gas-phase polymerization processes, including fluidized bed, horizontal stirred bed or vertical stirred bed reactors, or (2) bulk processes, including liquid pool or loop reactors, or (3) slurry processes, including continuous stirred-tank, batch stirred-tank, loop or boiling butane reactors, wherein the polymer produced is selected from the group comprising polyethylene, ethylene/alpha-olefin copolymers, polypropylene homopolymer, polypropylene impact copolymer, ethylene/propylene elastomers, and particularly including LLDPE and HDPE.

In accordance with one embodiment of the process of this invention, the cocatalyst/activator solvent is selected so that it is less volatile than the heaviest alpha olefin comonomer to facilitate the rejection of reactor byproduct saturated hydrocarbons and recovery of the comonomer from the waste gas stream(s), originating from the polymer product purge tanks, product purge bins, polymerization reactor and/or the monomer recirculation loop around the reactor, in the absorption unit.

Whichever product purge design is selected, it is inescapable that one or more waste gas streams comprised of unreacted monomers and the inert purge gas will be emitted from the reaction section and these streams are also the inlet streams to the absorption monomer recovery section of the process of this invention in accordance with the present invention.

The waste gas stream(s) from the polymer product purge tanks, product purge bins, polymerization reactor and/or the monomer recirculation loop around the reactor form stream 10 in FIG. 1 as the feed gas stream to the absorption recovery unit of the process of this invention. The reactor waste gas stream 10 is typically comprised of from about 15% to about 35% monomer, about 5% to about 20% comonomer, 2 to 5% hydrogen, 2 to 5% cocatalyst solvent, 1 to 5% reactor byproduct with the remainder being an inert gas, typically nitrogen, all by weight.

The absorption unit of the process of this invention treats the waste gas streams from the reactor section to reject reactor byproducts and recover monomers and solvents contained in the waste gas streams. Reactor waste gas streams typically contain nitrogen or other inert gas, hydrogen, ethylene, higher alpha-olefin comonomers. Reactor waste gas streams also contain heavier hydrocarbons including the cocatalyst solvent, and any condensable hydrocarbons added to the reactor feed to enhance heat removal in the reactor. The reactor purge streams also contain the reactor byproduct of saturated hydrocarbons formed as a result of a side reaction whereby small amounts of monomers are hydrogenated. In addition to the polymer purge with nitrogen in product bins and degassing units, the reactor system is purged at a rate to control the composition of the reactor byproducts in the monomer recirculation loop around the polymerization reactor.

The composition of reactor waste gas streams vary over a wide range depending on the design of the reactor system and the product grade being produced. The most commonly encountered reactor waste gas streams are the purge gas streams from the product purge tank such as stream 72 and from the reactor feed recirculation loop such as stream 40, not shown individually in FIG. 1 of this present invention but both streams are shown in co-pending U.S. application Ser. No. 08/398,349, filed Mar. 3, 1995, herein referred to as stream 10 in FIG. 1 of this present invention. For illustration and convenience, stream 40 of the co-pending application serves two functions: removal of oligomers and purging of reactor byproduct from the hydrogenation reaction.

As previously discussed, alternative reactor section designs can produce reactor waste gas streams from other sources in the reactor system. Clearly, any reactor waste gas stream comprising an inert or non-condensable gas containing monomers and/or solvents can be processed in the absorption unit to recover monomers and solvents. For example, fluidized bed reactors usually have top vent system to vent reactor gas during startups, shutdowns and upsets; these top vent streams can be treated in the reactor vent absorption unit of this invention to recover contained monomers.

The vent gas absorption unit produces one or more recovered monomer streams which contain the monomer, comonomers and solvents recovered from the vent gas. These streams can be conveyed into the reactor recycle gas line for recycle back to the reactor.

The vent gas absorption unit also produces a stream of higher pressure nitrogen, hydrogen and other light components that can be recycled back to the reactor or used as purge gas in the product purge tank or as transfer gas for conveying product polymer powder from the product discharge tank to the product purge tank. A part of this stream may be disposed by burning the stream in a flare stack.

FIG. 1 is a simplified process flow diagram of a vent gas absorption unit in accordance with the process of this invention. The reactor waste gas stream 10 is the feed stream to the vent gas absorption unit. Reactor waste gas stream 10 is compressed in vent gas compressor 12. The vent gas compressor can be a centrifugal compressor but typically a multi-stage reciprocating compressor equipped with interstage cooling is used for the service. The compressed waste gas stream 14 is cooled in vent gas cooler 16 which is typically a train of vent gas coolers in series and/or in parallel. Typically, the lead vent gas cooler is cooled with cooling water or ambient air, the intermediate cooler is cooled by the overhead stream 64 from the absorber stripper 26 as the stream leaves the process, and the downstream cooler is cooled with an appropriate refrigerant. As the compressed vent gas is cooled, heavy comonomers and other cocatalyst solvent hydrocarbons in the vent gas condense. The reactor vent gas condensate in stream 18 is separated from the reactor vent gas in a reactor vent gas separator 20. The condensate, which is rich in comonomer and/or cocatalyst solvent hydrocarbons, is conveyed into the reactor monomer recycle line using conduit 22. Since the pressure of the condensed stream is typically higher than the reactor pressure, it can be added at any appropriate point within the reactor recycle loop. Alternatively, condensate in stream 22 can be routed to the absorber stripper column 26 via stream 24 or stream 62 or conveyed to the distillation column 42.

The overhead gas stream 24 from the vent gas separator 20 is conveyed into the absorber stripper 26 at a suitable point 30 in the midsection of the tower and flows up the column. The section of the absorber stripper above the feed point 30 is termed the "absorption section" 28, and the section below the feed point is termed the "stripping section" 32. An absorption solvent stream 62 is pumped into the top of the absorber stripper and flows down the absorption section 28 countercurrently contacting the rising gas stream, absorbing ethylene and/or propylene monomers, reactor byproduct, higher alpha-olefin comonomers, and any cocatalyst solvent heavier hydrocarbons out of the reactor waste gas stream 24.

The absorber stripper overhead gas stream 64 contains most of the nitrogen, hydrogen and light gases that came into the absorber stripper with the reactor waste gas stream 24. The absorber stripper overhead gas stream 64 is typically used as the inert stripping gas in the product purge tank or as inert product transfer gas to convey product powder from the product discharge tank to the product purge tank (not shown here but are conventional to the polymerization processes). A portion or all of stream 64 may alternatively be flared.

Optionally, one or more side streams of solvent can be removed from the absorption section (not shown in FIG. 1). The side streams are cooled in intercoolers and injected back into the absorption section at points below the points where they were withdrawn. Intercooling mitigates the temperature rise of the solvent that occurs as heat of absorption is released by condensing of the monomer and higher hydrocarbons into the solvent. Intercooling improves the absorption effectiveness of the tower because the capacity for absorption of the lean solvent increases with decreasing solvent temperature.

Solvent flows down the absorption section 28 and into and down the stripping section 32. The absorber stripper bottoms stream 36 is comprised of absorption solvent, ethylene and/or propylene monomers, alpha-olefin comonomers, reactor byproduct and heavy cocatalyst solvent hydrocarbons that were absorbed by the absorption solvent in the absorption section 28. The solvent stream descending into the stripping section 32 from the absorption section 28 unavoidably contains some nitrogen, hydrogen and light components that were absorbed from the feed stream 24 in the absorption section 28. Light components left in the absorber stripper bottoms stream remain in the recovered monomer stream and are ultimately recycled back to the reactor. Preferentially, light components are stripped out of the absorber stripper bottoms stream in the stripping section 32 by reboiling absorber stripper with a reboiler 34. The reboiler 34 vaporizes part of the absorber stripper bottoms stream. The vaporized stream is conveyed into the bottom of the absorber stripper 26 and rises up the stripping section 32 countercurrently contacting the descending absorption solvent, thereby stripping light components out of the absorption solvent.

Optionally, in addition to the reboiler 34, one or more solvent side streams (not shown in FIG. 2) can be drawn from the stripping section and vaporized in interreboilers to produce additional stripping gas which is fed into the absorber stripper below the points where the solvent was withdrawn.

The temperature in the absorption section 94 is advantageously maintained in the range of from about 30° F. to about −60° F. and preferably in the range of from about −10° F. to about −50° F. Lower temperatures reduce monomer and solvent losses in the overhead gas stream but refrigeration power cost increases with decreasing temperature. Temperature in the absorption section 28 is reduced by cooling the absorption solvent 62 entering the absorber stripper in a solvent cooler 60 by heat exchange against an appropriate refrigerant such as propane or propylene. As previously discussed, the temperature rise in the absorption section may be mitigated by using an intercooler.

Pressure in absorber stripper is maintained in the range from about 75 psia to about 600 psia, preferably between about 150 psia and about 450 psia by controlling the back pressure of the overhead gas stream leaving from the top of the absorber stripper, using a back pressure regulating control valve. The solvent recirculation rate required to absorb the monomers and other components from the reactor waste gas stream decreases as pressure is increased.

It is important to cost effectively minimize the amount of monomer and absorption solvent lost in the absorber stripper overhead gas stream both to increase monomer recovery and preclude depletion of solvent from the system. Measures which can be taken in the design phase that improve absorption of ethylene and/or propylene monomers include providing more mass transfer stages—more mass transfer surface area and height, higher efficiency packing or trays, and adding intercoolers to the absorption section. Operating measures that can be taken to increase monomer absorption include increasing solvent circulation rate relative to gas feed rate, reducing the temperature of the solvent stream going to the tower and reducing the temperature of intercooled solvent.

Additionally, energy, monomers and solvents contained in the absorber stripper overhead gas stream can be recovered by isentropically expanding the stream in a gas expander. The expander can be conveniently coupled to the vent gas compressor so the shaft work extracted from the expanding gas stream drives the vent gas compressor. The temperature of the gas stream drops sharply as the gas stream expands isentropically across the expander causing monomers and other hydrocarbons in the absorber overhead gas stream to condense. The condensate is then separated from the gas stream and added back to one of the process streams at a convenient point. Alternatively, instead of using an expander, the absorber stripper overhead gas stream can be cooled by expansion across a pressure let down valve via the Joule-Thomson effect. However, no shaft work is recovered with a pressure let down valve. Condensation of monomers and other hydrocarbons can be enhanced by cooling the absorber stripper overhead gas stream in a refrigerated cooler prior to expansion.

These measures raise investment and operating costs, so there is an economic trade-off between minimizing overhead monomer and heavy hydrocarbon losses and controlling costs which is amenable to optimization.

The absorber stripper tower can be packed with an appropriate mass transfer packing material such as but not limited to Raschig or saddle rings. Alternatively, the absorber stripper can be equipped with appropriate distillation trays such as but not limited to bubble cap, sieve tray, valve or multi-downcomer trays.

The absorber stripper bottoms stream 36, which comprises absorption solvent containing absorbed monomers, comonomers, reactor byproduct and heavy hydrocarbons from the reactor waste gas stream 24, is conveyed to a distillation column 42 which fractionates the inlet stream 40 into a distillation column overhead stream 76 containing the ethylene and/or propylene monomer and reactor byproduct that have been absorbed out of the reactor waste gas stream 24 in the absorber stripper 26, and a bottoms stream 52 that is comprised of alpha-olefin comonomers, cocatalyst solvent heavy hydrocarbons. Optionally, the absorber stripper bottoms stream 36 on its way to the distillation column 42, may be heated in a heat exchanger 38 against the hot distillation column bottoms stream 56 to conserve energy by reducing the cooling load in solvent cooler 60 for cooling stream 58 to achieve the desired temperature of stream 62.

The distillation column overhead gas stream 66 is condensed in an overhead condenser 68, which can be a partial or a total condenser. If the overhead condenser 68 is a total condenser, part of the condensate is fed back into the top of the distillation column as reflux for the column and part of the condensate is taken off as the raw monomer stream 76. If, as shown in FIG. 1, the distillation column overhead condenser 68 is a partial condenser, then the condensate in stream 70 is separated from the vapor in a separation drum 72; the condensate is fed back into the top of the distillation column as the reflux stream 74, and the vapor stream 76 is the raw monomer stream that is conveyed to the splitter column 78.

The distillation column bottoms stream 52 is the absorption solvent that is fed into the top of the absorber stripper 26 through conduit 62. The distillation column bottoms stream 52 is comprised of alpha-olefin comonomers, cocatalyst solvent, heavy hydrocarbons from the reactor waste gas stream which includes inert condensables added to the reactor to increase heat removal capacity in the reactor, and possibly butane, hexane, octane or other alkanes that are usually present as impurities in the makeup monomer streams that are fed to the reactor. Typically, the heavy hydrocarbons are comprised of C4 to C10 paraffins, olefins, aromatics or mixtures thereof and are therefore in the desirable C4 and C10 hydrocarbon range for absorption as taught by Mehra.

Depending upon the absorption needs within the absorber stripper 26, most of the stream 52 is sent to the absorber stripper 26 via stream 56. By material balance around the absorption unit, stream 54 represents the recovered alpha-olefin comonomers, cocatalyst solvent and heavy hydrocarbons from the reactor waste gas stream which includes inert condensables added to the reactor to increase heat removal capacity in the reactor. This stream may be cooled if necessary and is conveyed to the reactor feed loop at a desirable injection point. Typically, a small "heavies" purge stream (not shown) may be withdrawn from stream 54 to prevent buildup of oligomers and other very heavy components in the absorption solvent.

The distillation column is typically of conventional design, including an overhead condenser and a reboiler, and its internals are typically distillation trays such as bubble cap or sieve trays but can also be a suitable mass transfer packing such as Raschig or saddle rings. Optionally (not shown in FIG. 1), the distillation column can be equipped with one or more intercoolers and interreboilers.

The monomer distillation tower is conventionally reboiled by vaporizing a slip stream from the bottom of the distillation column in a reboiler 50 and feeding the vapor into the bottom of the distillation column. The reboiler is typically a thermosyphon reboiler heated by steam or another suitable heating medium, but it can be any other suitable type of heat exchanger such as a multi-pass shell and tube heat exchanger.

Bottoms from the distillation column are accumulated in an accumulation zone 44 in the bottom of the column or in a drum external to the column. The accumulation zone 44 serves as the storage reservoir for the heavy hydrocarbon solvent. The liquid level in the bottoms accumulation zone 44 is continually monitored to ensure that an adequate inventory of solvent is maintained.

If it is observed that the level in the accumulation zone 44 has fallen below set point level, it means that rate of flow of heavy components in streams leaving the absorption monomer recovery unit, principally in the recovered comonomer stream 22 condensed from the reactor waste gas stream 10 and the overhead stream from the distillation column 76, exceeds the rate of flow of heavy components coming into the unit in the overhead gas stream 24 from the vent gas separator 20. Several adjustments can be made to increase absorption solvent inventory in the accumulation zone 44. Part of the recovered comonomer stream 22 can be conveyed to the accumulation zone 44. Or the exit temperatures from the vent gas condensers 16 can be increased to reduce the amount of heavy hydrocarbons condensed out of the reactor vent gas in stream 22. Alternatively, the distillation column 42 reflux rate in stream 74 can be increased to drive more heavy components down the column and into the distillation column bottoms stream 52. Alternatively or additionally, the reboil rate in the bottom of the distillation column 42 can be reduced by decreasing the flow of heating medium to the reboiler 50, which reduces the amount of heavy hydrocarbons lost in distillation column overhead stream 76 and increases bottoms inventory in the accumulation zone 44.

If it is observed that the level of bottoms in the accumulation zone 44 exceeds the setpoint level, reverse adjustment to those described above can be taken.

While maintaining inventory of bottoms in the accumulation zone 44 in the specified range, it is also possible to independently adjust the average molecular weight of the distillation column bottoms stream 52 within the range of molecular weights of the heavy components in the reactor waste gas stream 10 by adjusting the distillation column reboil rate and the reflux rate. Increasing the reboil rate increases the average molecular weight of the bottoms stream 52 and decreasing the reboil rate decreases the molecular weight of the bottoms stream. Increasing the reflux rate decreases the average molecular weight of the bottoms stream 52 and reducing the reflux rate increases the average molecular weight of the bottoms stream.

The pressure in the distillation column 42 is another independently controllable operating parameter. For a specified monomer distillation tower pressure, there is a unique correlation between the average molecular weight of the bottoms stream and the bottoms temperature. Accordingly, the average molecular weight of the bottoms stream can be conveniently monitored and controlled using bottoms temperature as a surrogate for the desired average molecular weight.

Optionally, the bottoms stream from the distillation column 56 going to the absorber stripper 26 is cooled in a heat exchanger 38 against the absorber stripper bottoms stream 36 flowing from the absorber stripper 26 to the monomer distillation tower 42. The distillation column bottoms stream 56 is cooled further by heat exchange against a refrigerants such as vaporizing propylene or propane in a solvent cooler 60. The cooled stream is fed into the top of the absorber stripper 26 through conduit 62 where it functions as the absorption solvent.

From the preceding discussion, it is now apparent that in preferred embodiments of the process of this invention, the absorption solvent is produced in the distillation column as the bottoms stream from the distillation column from heavy components in the reactor waste gas stream(s).

In an alternate embodiment of the present invention, an external solvent can be used as the absorption solvent. As taught by Mehra, the solvent is preferably selected from among hydrocarbons with 4 to 10 carbons and can include paraffins, olefins, naphthenes or aromatics. Specifically excluded are diolefins and acetylene because these compounds have propensity to oligomerize and concentrate in the towers and foul and plug the equipment. If an external solvent is used, facilities to receive, store and handle the external solvent are required and making up external solvent vented and leaked from the process adds additional cost.

The raw monomer stream 76 from the overhead of the distillation column 42 comprises the recovered ethylene and/or propylene monomers from the waste gas stream 10 as entering the absorption unit through stream 24. This raw monomer stream 76 also contains the reactor byproduct components as a result of the hydrogenation of monomers. The reactor byproduct components are ethane when ethylene monomer is polymerized in the reactor, and propane when propylene monomer is polymerized in the reactor.

The splitter column 78 fractionates the raw monomer stream 76 into a recovered monomer overhead stream 102 and a reactor byproduct bottoms stream 90. The splitter column overhead gas stream 92 is condensed in an overhead condenser 94, which can be a partial or a total condenser. If the overhead condenser 94 is a total condenser, part of the condensate is fed back into the top of the splitter column as reflux for the column and part of the condensate is taken off as the recovered monomer stream 102. If, as shown in FIG. 1, the splitter column overhead condenser 94 is a partial condenser, then the condensate in stream 96 is separated from the vapor in a separation drum 98; the condensate is fed back into the top of the splitter column as the reflux stream 100, and the vapor stream 102 is the recovered monomer stream that is conveyed to the polymerization reactor feed loop (not shown). Typically, a "lights" purge-stream 104 is withdrawn from the top of the reflux drum 98 or other convenient high point in the splitter column overhead system to purge non-condensable gases from the system.

The splitter column is typically of conventional design, including an overhead condenser and a reboiler, and its internals are typically distillation trays such as bubble cap or sieve trays but can also be a suitable mass transfer packing such as Raschig or saddle rings. Optionally (not shown in FIG. 1), the splitter column can be equipped with one or more intercoolers and interreboilers.

The splitter column is conventionally reboiled by vaporizing a slip stream from the bottom of the distillation column in a reboiler 88 and feeding the vapor into the bottom of the distillation column. The reboiler is typically a thermosyphon reboiler heated by steam or another suitable heating medium, but it can be any other suitable type of heat exchanger such as a multi-pass shell and tube heat exchanger.

The splitter column is operated as an ethylene-ethane splitter when the product from the polymerization process is polyethylene or as a propylene-propane splitter when the product from the process is polypropylene. However, the need for these services in the process of this invention as splitter column 78 is not to produce a polymer grade monomer, but to reject the byproducts of a hydrogenation reaction in the olefin polymerization reactor. Therefore, the operating conditions of pressure and temperature within the splitter column 78 are selected such that at the flowrate of the bottoms stream 90 multiplied by the concentration of the saturated hydrocarbon, either ethane or propane, in stream 90 represents the rate of production of the saturated hydrocarbons within the polymerization reactor. Any excess amounts of saturated hydrocarbons in the reactor purge gases making up the stream 10 are returned along with the recovered monomer in overhead stream 102. The rejection rate of saturated hydrocarbons in stream 90 can also be controlled by analyzing the content of these byproducts in the monomer recirculation loop around the polymerization reactor. The byproducts stream 90 forms a convenient fuel source for the olefin polymerization plant.

In certain processes depending upon the reactor type, there are additional raw monomer streams that contain reactor byproduct but do not contain any of the lighter components such as nitrogen and hydrogen. Such streams represented as stream 106 in FIG. 1 of this present invention can also be introduced at a convenient point 82 in the splitter column 78. Stream 106 can either enter column 78 separately or be combined with stream 76 before entering column 78. In order not to exceed certain level of reactor byproduct content in the feed to the polymerization reactor, typically 2 to 5% by weight, it is important that the feed streams 78 and 106 to the splitter column 78 include at least 110%, more preferably 125%, of the mount of saturated hydrocarbons to be rejected in stream 90. The closer the balance between the feed content of the saturated hydrocarbons to the amount of saturated hydrocarbons to be rejected in stream 90, the larger the size of the splitter column. Therefore, it is important that an economic balance be achieved between the capital and operating costs related to column 78 and selected composition of the reactor byproducts in the polymerization reactor feed recirculation loop.

Accordingly, the process of the present invention is directed to rejecting the saturated hydrocarbons byproduct formed in a polymerization reactor and recovering unreacted monomers, alpha-olefin comonomers, cocatalyst solvents and inert condensables contained in polymerization reactor waste gas streams for recycling to the reactor. Currently, reactor waste gas streams including reactor purge gases are burnt in flares because cryogenic processes are not sufficiently cost effective or flexible to process reactor waste gas streams. The present invention not only rejects reactor byproduct but also recovers unreacted monomers from reactor waste gas streams cost competitively, safely, and is sufficiently flexible and adaptable to cope with the wide ranging stream compositions and rates typical of the olefin polymerization units. Clearly, the cost of producing polyolefins is significantly reduced by the improvements encompassed in the process of the present invention.

EXAMPLES 1-2

Examples 1 and 2 present flow rates, composition, pressure and temperature for the key streams in the absorption unit of the process of this invention operating with three different but typical reactor waste gas streams from the olefin polymerization processes. The stream numbers in the examples refer to FIG. 1: reactor waste gas 10, compressed vent gas 24, comonomer condensate 22, light components 64, raw monomer 76, recovered comonomer/cocatalyst solvent 54, recovered monomer 102, reject reactor byproduct 90 and absorption solvent 62. The stream data are from heat and material balances computed using a commercial process simulation computer program widely used to design process plants.

EXAMPLE 1

The waste gas stream 10 in Example 1 is from a reactor producing a copolymer of ethylene monomer and 1-butene comonomer. The cocatalyst solvent is iso-butane which appears in the waste gas stream as the heavy hydrocarbon and in accordance with this invention iso-butane is concentrated in the distillation column 42 to form the absorption solvent. No condensate forms in the vent gas cooler 16 as stream 22. To control the melt index of the copolymer, hydrogen is added to the reactor system, whereby a side reaction hydrogenates a part of the ethylene to ethane at the rate of 120.4 lb/hr. This amount of ethane is to be rejected to prevent build-up of ethane in the reactor recirculation loop thereby reducing the polymer production capacity.

In the absorption unit of this present invention, column 78 is operated to precisely reject 120.4 lb/hr of ethane byproduct produced in the polymerization reactor via stream 90, which is used as fuel within the polymerization facility. Additionally, about 97% of the ethylene monomer in the reactor waste gas stream 10 is recovered in the absorption unit and recycled to the reactor via stream 102. Furthermore, the light component stream 64 comprises about 92.7 wt % nitrogen and is useful for stripping adsorbed ethylene monomer from the polymer in product purge bins. The recovered comonomer 1-butene and cocatalyst solvent iso-butane (92.2% recovery for 1-butene and 92.2 recovery of iso-butane, respectively) are conveyed to the reactor feed loop via stream 54.

EXAMPLE 1

| Component | lb/hr | lb/hr | lb/hr | lb/hr |
| --- | --- | --- | --- | --- |
| Stream | 10 | 24 | 64 | 76 |
| Hydrogen | 9.4 | 9.4 | 9.4 | 0.0 |
| Nitrogen | 347.2 | 347.2 | 347.2 | 0.0 |
| Ethylene | 304.5 | 304.5 | 1.2 | 303.0 |
| Ethane | 134.3 | 134.3 | 1.1 | 132.6 |
| 1-Butene | 24.4 | 24.4 | 1.5 | 0.0 |
| iso-Butane | 180.3 | 180.3 | 14.1 | 0.3 |
| Total, lb/hr | 1,000.0 | 1,000.0 | 374.4 | 435.9 |
| Temperature, °F. | 97.2 | 60.8 | −34.8 | 20.4 |
| Pressure, psia | 14.8 | 452 | 443 | 440 |
| Stream | 54 | 102 | 90 | 62 |
| Hydrogen | 0.0 | 0.0 | 0.0 | 0.0 |
| Nitrogen | 0.0 | 0.0 | 0.0 | 0.0 |
| Ethylene | 0.4 | 295.0 | 8.0 | 7.2 |
| Ethane | 0.6 | 12.2 | 120.4 | 12.6 |
| 1-Butene | 22.5 | 0.0 | 0.0 | 460.2 |
| iso-Butane | 166.2 | 0.0 | 0.3 | 3,407.7 |
| Total, lb/hr | 189.6 | 307.2 | 128.7 | 3,887.7 |
| Temperature, °F. | 100.00 | 8.1 | 45.1 | −35.0 |
| Pressure, psia | 453 | 430 | 435 | 448 |

EXAMPLE 2

The waste gas stream 10 in Example 2 is from the deactivation column overhead in plant producing a copolymer of propylene monomer. In addition, propane produced by hydrogenation in the polymerization reactor is purged by taking a slip stream from the propylene recycle stream. Herein, it is represented by stream 106. In this propylene polymerization process, there is no cocatalyst or heavy hydrocarbon stream that could be utilized for solvent in the absorption unit in accordance with the present invention. Therefore, an external solvent comprised of n-hexane is utilized as the solvent in stream 62. The production rate of propane in the polymerization reactor is 194.9 lb/hr. Therefore, the absorption unit in accordance with the process of this invention must reject 194.9 lb/hr of propane.

In the absorption unit of this present invention, column 78 is operated to precisely reject 194.9 lb/hr of propane byproduct produced in the polymerization reactor via stream 90, which is used as fuel within the polymerization facility. Additionally, about 91% of the propylene monomer in the reactor waste gas stream 10 and byproduct purge stream 106 is recovered in the absorption unit of this invention and recycled to the reactor via stream 102. Furthermore, the light component stream 64 comprises about 99.8 wt % nitrogen and is useful for stripping adsorbed propylene monomer from the polymer in product purge bins. Instead of recovering the heavier comonomer and cocatalyst solvent in Example 1, in this application, make-up solvent is introduced into the process through stream 54 at a rate no greater than 2.6 lb/hr as determined by loss represented in streams 64 and 90. After the process reaches a steady state operation, the solvent present in stream 64 will return in the feed stream 10 due to reuse of the high pressure light component stream 64 in product purge bins. Accordingly the make-up rate for n-hexane solvent will be reduced to the 0.9 lb/hr rate, which is equivalent to the loss in stream 90. Stream 90 is used as fuel within the polymerization facility.

EXAMPLE 2

| Component | lb/hr | lb/hr | lb/hr | lb/hr |
|---|---|---|---|---|
| Stream | 10 | 24 | 64 | 76 |
| Hydrogen | 0.0 | 0.0 | 0.0 | 0.0 |
| Nitrogen | 1,000.0 | 1,000.0 | 999.0 | 0.1 |
| Ethylene | 0.0 | 0.0 | 0.0 | 0.0 |
| Propylene | 246.0 | 246.0 | 0.1 | 245.9 |
| Propane | 54.0 | 54.0 | 0.0 | 54.0 |
| n-Hexane | 0.0 | 0.0 | 1.7 | 0.9 |
| Total, lb/hr | 1,300.0 | 1,300.0 | 1,001.7 | 300.9 |
| Temperature, °F. | 110.0 | 13.5 | −34.8 | 98.4 |
| Pressure, psia | 15.7 | 257 | 250 | 210 |
| Stream | 106 | 102 | 90 | 62 |
| Hydrogen | 0.1 | 0.1 | 0.0 | 0.0 |
| Nitrogen | 0.0 | 0.1 | 0.0 | 0.0 |
| Ethylene | 9.8 | 9.8 | 0.0 | 0.0 |
| Propylene | 950.2 | 1,091.8 | 104.3 | 0.3 |
| Propane | 240.0 | 99.1 | 194.9 | 0.1 |
| n-Hexane | 0.0 | 0.0 | 0.9 | 8,617.8 |
| Total, lb/hr | 1,200.1 | 1,200.9 | 300.1 | 8,618.2 |
| Temperature, °F. | 100.0 | 107.6 | 125.6 | −35.0 |
| Pressure, psia | 280 | 272 | 282 | 260 |

Although the present invention has been described in considerable detail with reference to the preferred embodiments discussed, other embodiments are possible and are readily understood by those skilled in the process engineering arts. Therefore, the spirit and scope of the appended claims are not limited to the specific preferred process embodiments described herein.

What is claimed is:

1. A process for rejecting reactor byproduct formed by hydrogenation of monomer(s) in an olefin polymerization reactor, wherein waste stream(s) from reactor purge or product purge tanks in an olefin polymerization process comprising inert light components, unreacted monomers and reactor byproduct are treated in a process comprising the steps of:

(a) contacting the reactor waste gas stream(s) with an absorption solvent stream in an absorption zone, to produce an absorption zone overhead gas stream comprised of light components and an absorption zone bottoms liquid stream comprised of absorption solvent, absorbed monomers and absorbed reactor byproducts;

(b) fractionating the absorber bottoms stream in a distillation column to produce a distillation column overhead stream comprising monomers and reactor byproducts, and a distillation column bottoms stream comprising absorption solvent;

(c) conveying the bottoms stream from the distillation column to the absorption zone as the absorption solvent stream in step (a); and (d) fractionating the distillation column overhead stream in a splitter column to produce a monomer splitter bottoms stream comprising said reactor byproduct and a monomer splitter overhead stream comprising unreacted monomers.

2. The process of claim 1 comprising the additional step of conveying the splitter column overhead stream in step (d) into the polymerization reactor.

3. The process of claim 1 comprising the additional steps prior to contacting the reactor waste gas stream(s) with the absorption solvent stream of:

(i) compressing the reactor waste gas stream(s);

(ii) cooling the compressed waste gas stream(s) to form a condensate and separating the condensate from the compressed and cooled reactor waste gas stream(s); and (iii) conveying the condensate to the polymerization reactor, or to the absorption zone of step (a) or to the distillation column of step (b).

4. The process of claim 1 wherein the monomers comprise ethylene.

5. The process of claim 1 wherein the monomers comprise propylene.

6. The process of claim 1 wherein the light components comprise nitrogen.

7. The process of claim 1 wherein the absorption solvent comprises a $C_4$ to $C_{10}$ hydrocarbon that is less volatile than the monomers.

8. The process of claim 1 wherein a slip stream of monomer recycle stream comprising monomer and reactor byproduct is additionally processed in the splitter column of step (d).

9. A process for rejecting reactor byproduct formed by hydrogenation of monomer(s) in an olefin polymerization reactor, wherein waste stream(s) from the reactor purge or product purge tanks in an olefin polymerization process comprising inert light components, unreacted monomers, said reactor byproduct and heavy hydrocarbons are treated in a process comprising the steps of:

(a) contacting the reactor waste gas stream(s) with an absorption solvent stream in an absorption zone, to produce an absorption zone overhead gas stream comprised of light components and an absorption zone bottoms liquid stream comprised of absorption solvent, absorbed monomers, absorbed reactor byproduct and heavy hydrocarbons;

(b) fractionating the absorber bottoms stream in a distillation column to produce a distillation column overhead stream comprising monomers and reactor byproduct, and a distillation column bottoms stream comprising heavy hydrocarbons that are derived from the reactor waste gas stream(s);

(c) conveying the bottoms stream from the distillation column to the absorption zone as the absorption solvent stream in step (a); and (d) fractionating the distillation column overhead stream in a splitter column to produce a monomer splitter bottoms stream comprising said reactor byproduct and a monomer splitter overhead stream comprising unreacted monomers.

10. The process of claim 9 comprising the additional step of conveying the splitter column overhead stream in step (d) into the polymerization reactor.

11. The process of claim 9 comprising the additional steps prior to contacting the reactor waste gas stream(s) with the absorption solvent stream of:

(i) compressing the reactor waste gas stream(s);

(ii) cooling the compressed waste gas stream(s) to form a condensate and separating the condensate from the compressed and cooled reactor waste gas stream(s); and (iii) conveying the condensate to the polymerization reactor, or to the absorption zone of step (a) or to the distillation column of step (b).

12. The process of claim 9 wherein the monomers comprise ethylene.

13. The process of claim 9 wherein the monomers comprise propylene.

14. The process of claim 9 wherein the light components comprise nitrogen.

15. The process of claim 9 wherein the heavy hydrocarbons are comprised of $C_4$ to $C_{10}$ hydrocarbons.

16. The process of claim 9 wherein a slip stream of monomer recycle stream comprising monomer and reactor byproduct is additionally processed in the splitter column of step (d).

17. The process of claim 9 wherein a cocatalyst is fed into the reactor dissolved in a catalytically inert hydrocarbon solvent that is less volatile than the monomer(s) and the cocatalyst solvent is the heavy hydrocarbon of step (b).

18. The process of claim 9 wherein a catalytically inert hydrocarbon liquid less volatile than the monomers is fed into the reactor and vaporizes in the reactor to absorb heat of polymerization and the inert hydrocarbon fluid is less volatile than the monomers and is the heavy hydrocarbon of step (b).

19. The process of claim 9 wherein the absorption solvent comprises the least volatile monomer.

20. The process of claim 1 or 9 wherein the absorption zone is an absorber stripper, the process comprising the additional step of: reboiling or both reboiling and interreboiling the absorber stripper bottoms stream so as to strip light components out of the absorber stripper bottoms stream.

21. The process of claim 1 or 9 wherein the absorption zone is an absorber stripper, the process comprising the additional step of: intercooling the absorber stripper.

22. The process of claim 1 or 9 wherein the distillation column is refluxed and reboiled and column bottoms are accumulated in an accumulation zone, the process comprising the additional step of: adjusting the reflux and reboil rates to control bottoms inventory in the accumulation zone within a specified range.

23. The process of claim 1 or 9 wherein the distillation column is refluxed and reboiled, the process comprising the additional step of: adjusting the reflux and reboil rates to control the average molecular weight of the distillation column bottoms stream at a specified value.

24. The process of claim 1 or 9 comprising the additional steps of:
 (e) depressuring the overhead gas stream from the absorption zone across an expansion device wherein the temperature of the stream is decreased forming condensate; and
 (f) separating the condensate from the cooled zone overhead gas stream and conveying the condensate to the absorption zone or the distillation column.

25. The process of claim 24 wherein the expansion devise is an expander.

26. The process of claim 24 wherein the expansion devise is a pressure letdown valve.

27. The process of claims 1 or 9 wherein the waste gas stream(s) comprise inert components in major part.

28. The process of claims 1 or 9 wherein the olefin polymerization process is selected from the group consisting of:
 (1) gas-phase polymerization processes, including fluidized bed, horizontal stirred bed or vertical stirred bed reactor processes;
 (2) bulk processes, including liquid pool or loop reactor processes; and
 (3) slurry processes, including continuous stirred-tank, batch stirred-tank, loop or boiling butane reactor processes.

29. The process of claims 1 or 9 wherein the olefin polymer produced is selected from the group comprising of polyethylene, ethylene/alpha-olefin copolymers, polypropylene homopolymer, polypropylene impact copolymer, ethylene/propylene elastomers, and particularly including LLDPE and HDPE.

30. The process of claims 1 or 9 wherein the reactor byproducts are ethane, propane or ethane/propane.

* * * * *